United States Patent Office 2,951,778
Patented Sept. 6, 1960

2,951,778

HIGH TEMPERATURE ADHESIVE CONTAINING POLYEPOXIDE RESIN MIXTURE

Richard J. Haberlin, Framingham Center, Mass., assignor to W. R. Grace & Co., Cambridge, Mass., a corporation of Connecticut No Drawing. Filed June 5, 1958, Ser. No. 739,981

7 Claims. (Cl. 154—43)

This invention relates to a composition of matter containing polyepoxide materials. The composition serves as an excellent adhesive and is particularly useful for bonding metal to metal to produce a seal which is resistant to extreme variation in temperature.

Epoxy resins have achieved wide use in such applications as adhesives, laminates, castings, sealants, and coatings. The general methods of preparation and formulations are well described in the literature as, for example, in the recent text "Epoxy Resins, Their Applications and Technology," by Henry Lee and Kris Neville, McGraw-Hill, 1957. They may be prepared by the reaction of a dihydric phenol and epichlorohydrin in the presence of sufficient alkali to maintain the reaction mixture substantially neutral.

The predominant constituent of the reaction product is represented by the formula:

(1)
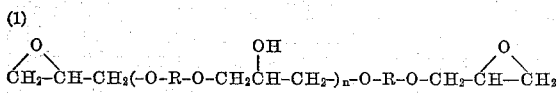

wherein R represents a divalent aromatic hydrocarbon radical and "n" is an integer. By varying the ratio of epichlorohydrin to the dihydric phenol, compositions of varying molecular weight (varying "n") may be obtained, the value of "n" decreasing as the quantity of epichlorohydrin is increased.

Considering for purposes of illustration the most widely employed dihydric phenol, bis (4-hydroxy phenyl) dimethyl methane (hereinafter termed Bisphenol A) the diglycidyl ether has the formula:

(2)
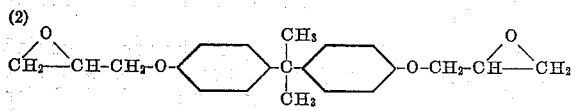

where "n" of Formula 1 is zero. By employing a mole ratio of epichlorohydrin to Bisphenol A of 10:1 the diglycidyl ether is produced in a fairly pure state. As the mole ratio is decreased the proportion of higher molecular weight polyethers increases. In general, mole ratios of 2:1 to 10:1 give average molecular weights of about 350 to 450. In practice it is found that though the size of the major portion of the polyether molecules may be controlled, some small proportion of longer and shorter length molecules will be present. In addition side reactions may occur with some formation of intermediates, but the quantity of these side products does not noticeably influence the properties of the resin.

For use in adhesives it is often desirable to employ epoxy resins which are sufficiently low in molecular weight to have fluidity at ordinary temperatures so as to facilitate mixing with fillers and produce a material which can be easily spread and dispensed from nozzles. Such low molecular weight glycidyl polyethers, however, do not have adequate shear strength and resistance to mechanical shock to be of much use when bonding metal to metal. Particularly, such resins lack strength at high temperatures.

It is an object of my invention to provide a sealant which cures rapidly and evenly.

A second object is to produce a sealant which maintains sufficient flexibility and compressibility after curing to withstand cracking from mechanical shock.

It is, moreover, the object of my invention to provide a sealant which has heat expansion properties such as to avoid cracking or separation when exposed to wide variations in temperature.

In addition, it is my object to produce a sealant which maintains its strength and sealing properties for brief periods of time at temperatures in excess of 315° C.

These and other objects have been accomplished as will be hereinafter described.

I have discovered a composition of matter which is an excellent adhesive and particularly fine metal-to-metal bonding agent. The composition is a mixture of three essential components: (I) a low molecular weight glycidyl polyether, (II) a condensation product of a low molecular weight glycidyl polyether and ethylene glycol and (III) a curing agent composed of pyromellitic dianhydride mixed with the anhydride of a dicarboxylic acid. When these components are combined in the hereinafter described proportions a resinous mixture is obtained which upon heating to elevated temperatures cures to a hard, strong sealant. In addition to the above ingredients it is ordinarily desirable to include various fillers and a cure accelerating agent.

Component I, the low molecular weight glycidyl ether, is prepared as discussed above. Using Bisphenol A as the dihydric phenol the average molecular weight desired is between about 350 and 450. With other dihydric phenols this range will vary slightly. Referring to Formula 1 the average molecule of the ether will contain between 1 and 1.5 R's (aromatic radicals) and "n" will vary from 0 to 1. The epoxide equivalent (weight of resin in grams containing 1 gram equivalent of epoxy) should be between about 175 and 225. Assuming the resin chains to be substantially linear with an epoxy group terminating each end, then the epoxide equivalent is one-half the average molecular weight. The viscosity of the polyether will vary from 5,000 to 20,000 cps. as measured with a Brookfield LVT–5X viscometer with No. 5 spindle at 6 r.p.m. at 25° C. Many commercially available epoxy resins with suitable properties may be used. Among these are "Bakelite ERL–2774" and Bakelite ERL–3794," "Epi-Rez 510," "Epon 820" and "Epon 828." "Bakelite" is the trademark of Union Carbide Corp.; "Epi-Rez" is the trademark of the Jones-Dabney Co., Div. of Devoe & Raynolds Co.; "Epon" is the trademark of the Shell Chemical Corp.

Component II is the reaction product of component I with a glycol, for example, ethylene glycol. The ratio of epoxy to hydroxy can be varied from 1/0.5 to ½ with little effect on the finished compound. The reaction may be carried out by mixing the desired quantities of epoxy and ethylene glycol and heating to 150° to 185° C. for 1 hour or until the mixture becomes homogeneous.

The product has a molecular weight of 385 to 485 and is believed to consist primarily of the product resulting from the reaction of one epoxide ring with an hydroxyl group of the glycol. Since component I can be considered to contain an average of two epoxy groups per molecule, it is quite certain that the primary condensation product resulting from such controlled conditions may be represented by the formula:

(3)
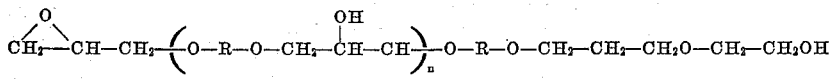

For convenience I shall refer to the condensation product as the 50% condensate of component I with a glycol.

Component II lends flexibility to my resin composition, but must be used in controlled amounts. I have found empirically that the ratio of component I to component II may vary from 20/80 to 12/88 parts by weight with good results. When the quantity of component II is more than 88 parts, the resin after curing is gel-like and weak. When the amount of component II is less than 80 parts, the composition cures to a brittle, easily cracked material.

The third component (III) of my composition is a curing agent which acts to cross-link the epoxy compounds. The curing agent which I prefer to use is a mixture of a primary curing agent, pyromellitic dianhydride, and a secondary curing agent selected from the group of organic acid anhydrides. The anhydride mixture is used in stoichiometric quantities based on the amount of epoxy and hydroxyl groups present in the resin mixture. A slight excess, about 5%, is employed in the case of solid acid anhydrides to allow for uneven dispersion of the anhydride powders in the resin.

Anhydrides of dicarboxylic acids are well known in the art as curing agents and include phthalic anhydride, maleic anhydride, succinic anhydride, dodecenylsuccinic anhydride, and hexahydrophthalic anhydride.

By using the above described mixture of curing agents, I am able to produce properties in my cured resin which are most desirable and cannot be obtained with either curing agent used alone. The pyromellitic dianhydride, for example, raises the heat distortion temperature of the cured resin and prevents the resin from cracking when it is cooled down following exposure to very high temperatures. However, since the pyromellitic dianhydride is more reactive than the monoanhydrides, it cures more rapidly and has a tendency to reduce the shelf life of the composition. The use of a certain amount of a monoanhydride curing agent not only prolongs the shelf life of the composition, but also greatly increases the flexibility and therefore the sealing properties of the cured resin.

Depending upon the particular anhydride curing agent used, the proportions of primary and secondary curing agents in component III may be varied within certain well-defined limits. I have found that 2 to 15 parts by weight of pyromellitic dianhydride and 43 to 17 parts by weight of secondary anhydride for every 100 parts by weight of resin give satisfactory sealing materials for high temperature uses.

The manner in which component III is added to the epoxy compositions will depend upon the particular anhydrides in component III. Phthalic anhydride must ordinarily be passed with the resin through a colloidal mill to get a good dispersion. Maleic anhydride, on the other hand, is sufficiently fine to be mixed in by hand.

When it is desired to shorten the curing time, various well-known cure accelerators may be added to the composition. Among these are alphamethylbenzyl dimethyl amine, n-butyl amine, pyridine and N-methyl pyridine. These are used in catalytic amounts, from 0.5 to 3% of the weight of the resins in the composition.

In addition to the above basic ingredients it is advantageous to add various fillers to the composition to add body, adjust viscosity, increase thermal conductivity and hence achieve more even cure and lower the coefficient of the thermal expansion. Among the fillers which can be used are atomized aluminum, iron, copper, aluminum oxide, silica powder, mica, and asbestos. Fibrous materials such as fine asbestos tend to bind the resin together and counteract differences in thermal expansion between the resin and the bonded metal. The quantity of filler may be varied from a few percent to three or four times the weight of the resin. The compounding manipulations are well-known to those skilled in the art.

The following examples illustrate the preparation of the compositions of my invention. The amounts of the various ingredients used in the examples are expressed as parts by weight.

Example I

A commercial epoxy resin, "Epi-Rez 510" with the following properties was employed as component I:

Viscosity _____ 12,000 cps. at 25° C.
Specific gravity _____ 1.15.
Color _____ 3 (Gardner scale).
Epoxide equivalent _____ 185.
Hydrolyzable Cl _____ <0.1%.

Component II is also a commercial epoxy resin, "Epi-Rez 507" which is the condensation product of component I and ethylene glycol in the previously described ratios. It has the following properties:

Viscosity _____ 550 cps. at 25° C.
Specific gravity _____ 1.14.
Color _____ 2 (Gardner scale).
Epoxide equivalent _____ 385.
Hydrolyzable Cl _____ <0.15%.

Twelve parts of component I was blended with 88 parts of component II and 43 parts of phthalic anhydride and passed through a colloid mill to reduce the particle size of the phthalic anhydride to 0.025 mm. or less. Care must be maintained to keep the temperature below about 50° C. during passage through the mill. After cooling to room temperature 2.5 parts of pyromellitic dianhydride was added together with 55 parts of micronized silica, 35 parts of atomized aluminum, and 350 parts of short fiber asbestos. The mixture was thoroughly blended while maintaining the temperature of the mix below about 25° C. and 0.3 part of pyridine were added to the mixture to act as a cure accelerator. The composition was applied to two steel rods about 2.5 cm. by 1.25 cm. by 30 cm. and the steel rods were pressed together end to end. These rods were heated to 205° C. for 15 minutes to cure the composition. The rods were then raised to 315° C., allowed to cool to room temperature and heated again to 345° C. The resin bond remained strong with no cracks or thermal decomposition noticeable.

As a further test of the ability of the composition of Example I to withstand high temperatures, a sample of the composition which had been cured at 205° C. for 15 minutes was placed in contact with a surface at 315° C. for a period of eight hours. There was no evidence of serious charring or decomposition, and the sample retained its normal compressibility.

Example II

Component I was prepared in the manner described in U.S. Patent No. 2,682,515, column 6, under the heading "Polyether A."

Component II was prepared by adding 46.5 grams of ethylene glycol to 180 grams of component I. The reaction mixture was maintained at 150° C. for 1 hour. Upon cooling there resulted a clear, low viscosity monofunctional-epoxy flexibilizer.

Sixteen parts of component I was mixed with 84 parts of component II and blended well at 25° C. To the mix was added 13.8 parts of pyromellitic dianhydride, 19.4 parts of maleic anhydride, 75 parts of micronized silica, 25 parts of atomized iron, and 150 parts of short fiber asbestos. After mixing well a homogeneous blend of milk-like consistency was produced. To this was added 0.4 part of N-methyl pyridine to act as a cure accelerator.

The composition was spread on steel rods and baked for 20 minutes at 175° C. After carrying out the heating and cooling steps of Example I, the bond was found to retain its strength.

Though in the foregoing examples component II was in each case a condensate of component I and ethylene glycol, this need not be the case. Component II of Example I could have been substituted for component II of Example II and vice versa. It is only necessary that component II be approximately a 50% condensate of a glycol and a glycidyl polyether epoxy resin having a molecular weight between about 350 and 450, an epoxide equivalent of 175–225, between 1 and 1.5 aromatic radicals per polyether chain and a viscosity between 5,000 and 20,000 cps.

Also, though I have shown component I to be made from Bisphenol A and epichlorohydrin for purposes of illustration, other dihydric phenols are suitable. These include resorcinol; 1,1-bis (4-hydroxyphenyl) ethane; 1,1-bis (4-hydroxyphenyl) propane; 1,1-bis (4-hydroxyphenyl) butane; 2,2-bis (4-hydroxyphenyl) butane and 1,1-bis (4-hydroxyphenyl) 2-methyl propane.

I claim:

1. A composition of matter comprising in admixture (1) a glycidyl polyether A of a dihydric phenol having a viscosity of 5,000 to 20,000 cps. at 25° C., a molecular weight of about 350 to 450, an epoxide equivalent of 175 to 225 and containing an average of 1 to 1.5 divalent aromatic radicals per molecule; (2) a 50% condensate of a glycidyl polyether B of a dihydric phenol having a viscosity of 5,000 to 20,000 cps. at 25° C., a molecular weight of about 350 to 450, an epoxide equivalent of 175 to 225 and containing an average of 1 to 1.5 divalent aromatic radicals per molecule, and a glycol, said condensate having a molecular weight of about 385 to 485 and containing approximately one-half the epoxide groups of the said glycidyl polyether B still unreacted, and (3) a mixture of pyromellitic dianhydride and the anhydride of a dicarboxylic acid; said polyether and said 50% condensate being present in a ratio between 12/88 and 20/80 parts by weight.

2. The composition of claim 1 containing fillers and an amine.

3. The composition of claim 1 in which the pyromellitic dianhydride is present in the proportion of 2 to 15 parts by weight and the anhydride of the dicarboxylic acid is present in the proportion of 43 to 17 parts by weight based on 100 parts by weight of the resin.

4. A composition as set forth in claim 1 wherein the said glycidyl polyether A has an epoxide equivalent of 185 and a viscosity of about 12,000 cps. at 25° C., the said 50% condensate is the reaction product between ethylene glycol and the said glycidyl polyether A, and the ratio between the said glycidyl polyether and the said 50% condensate is 12:88 parts by weight.

5. The composition of claim 4 containing fillers and an amine.

6. An article of manufacture which comprises at least two metallic components, said metallic components being bonded together by the high temperature-resistant metal-to-metal adhesive formed by heat-curing the composition claimed in claim 1.

7. The composition of claim 1 in which the said glycidyl polyether B is identical with the said glycidyl polyether A.

References Cited in the file of this patent

UNITED STATES PATENTS

| | | |
|---|---|---|
| 2,728,744 | May et al. | Dec. 27, 1955 |
| 2,731,444 | Greenlee | Jan. 17, 1956 |
| 2,768,153 | Shokal | Oct. 23, 1956 |

UNITED STATES PATENT OFFICE
CERTIFICATION OF CORRECTION

Patent No. 2,951,778                            September 6, 1960

Richard J. Haberlin

It is hereby certified that error appears in the above numbered patent requiring correction and that the said Letters Patent should read as corrected below.

Columns 3 and 4, lines 4 to 6, formula (3) should appear as shown below instead of as in the patent:

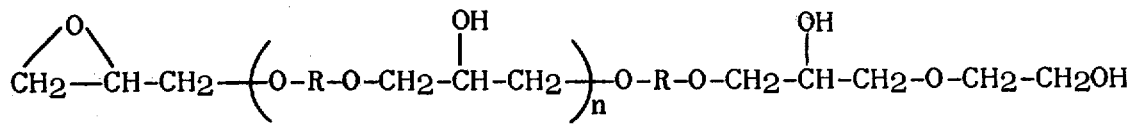

Signed and sealed this 16th day of May 1961.

(SEAL)
Attest:

ERNEST W. SWIDER                                    DAVID L. LADD

Attesting Officer                                       Commissioner of Patents